April 16, 1957 WEN YUAN PAN 2,789,215

DIODE FREQUENCY CONVERTER WITH COMBINED LOCAL OSCILLATOR-INTERMEDIATE FREQUENCY AMPLIFIER HAVING COMMON TRIODE

Filed Nov. 1, 1955

INVENTOR.
WEN YUAN PAN

BY H. L. Newton

ATTORNEY 2,789,215
Patented Apr. 16, 1957

2,789,215

DIODE FREQUENCY CONVERTER WITH COMBINED LOCAL OSCILLATOR-INTERMEDIATE FREQUENCY AMPLIFIER HAVING COMMON TRIODE

Wen Yuan Pan, Haddon Heights, N. J., assignor to Radio Corporation of America, a corporation of Delaware Application November 1, 1955, Serial No. 544,184

5 Claims. (Cl. 250—20)

This invention relates generally to frequency converters for high frequency signal receiving systems, and more particularly to frequency conversion systems of the type wherein a received signal modulated carrier wave is mixed with a locally generated oscillation signal to produce an intermediate frequency signal having modulation components corresponding to those of the received signal.

Although the present invention thus relates to superheterodyne receivers generally, it also relates to converters for adapting receivers designed to receive signals in certain frequency bands for the reception of signals in other bands, such for example, as ultra high frequency (U. H. F.) television converters which are used to adapt existing very high frequency (V. H. F.) television receivers for the reception of U. H. F. signals.

As is well known, the allocation of new U. H. F. television channels in localities already served by V. H. F. television stations has presented a major problem as to the provision of suitable means at a reasonable cost to receive the U. H. F. transmissions with existing V. H. F. television receivers. A solution to the problem has been to provide, in each case, a U. H. F. converter, which converts a received U. H. F. signal to a signal at the frequency of an unused V. H. F. channel in the particular locality of reception. The converted signal is then applied to the antenna or signal input terminals of the V. H. F. receiver in the same manner as is any received V. H. F. television signal. Alternatively, the U. H. F. signal may be converted directly, in the U. H. F. converter, to the intermediate frequency of the V. H. F. television receiver and applied to the input circuit of its intermediate frequency amplifier.

Most U. H. F. converters presently in use include, in addition to the signal selection circuits, either a crystal mixer or a vacuum tube mixer stage, a U. H. F. oscillator, and an intermediate frequency (I. F.) amplifier. The selected U. H. F. signal is combined with a signal from the local oscillator at the signal mixer stage to produce a resultant I. F. signal. The I. F. signal is then amplified by the I. F. amplifier to increase the level of the converted U. H. F. signal which is then applied to the V. H. F. receiver. Among other things, the I. F. amplification masks the noise introduced in the circuits following the converter and generally improves the noise factor of the receiver for U. H. F. reception and is therefore necessary for optimum converter operation. Although these converter units are generally available at moderate cost, it is desirable that a minimum cost unit having good performance characteristics be provided to enable maximum viewer coverage for the new U. H. F. stations.

It is an object of this invention to provide an improved high frequency conversion system which retains the advantages of a converter of the general type described above, which is of simplified design and construction thereby requiring fewer component parts, and which is adapted to be easily manufactured in large quantities at low cost.

In accordance with the present invention, the conversion system includes a dual function stage that simultaneously operates as an intermediate frequency amplifier and as an ultra high frequency oscillator. The use of the dual function stage eliminates the necessity for at least one electron tube section in the converter unit in addition to several circuit components, while retaining all the operational advantages of the more complicated converter system described above. For example, where a single stage operates as both the heterodyne oscillator and I. F. amplifier, a single coupling circuit may be provided between that stage and the signal mixer which serves to couple oscillation signals to the signal mixer and to convey the resultant I. F. signals to the I. F. amplifier, thereby eliminating the necessity of separate signal coupling and oscillator injection circuits.

Due to the great difference in frequency between the oscillator and I. F. signals, there is relatively little interaction between the amplifier and the oscillator. Furthermore, the dual function stage may be connected for one mode of operation for the amplifier circuit, such as grounded grid operation, while the oscillator may be grounded plate, or use a balanced oscillator circuit, for example.

A feature of the frequency converter of the invention as that the coupling circuit provided between the mixer and the dual function oscillator-amplifier stage may be used which provides optimum transfer characteristics for the modulated input signals, oscillator signals, and I. F. signals respectively.

Accordingly, it is a further object of this invention to provide an improved converter unit of the type described, wherein the high frequency oscillator and I. F. amplifier are combined in a single dual function stage.

A further object of this invention is to provide an improved high frequency conversion system wherein only a single signal coupling circuit is required between a dual function oscillator-amplifier stage and the signal mixer for conveying oscillation signals to the mixer, and I. F. signals to the dual function stage.

It is a further object of this invention to provide an improved converter unit of the general type described which has a reduced number of components while maintaining high efficiency in operation.

The novel features which are considered characteristic of this invention are set forth with particularity in the appended claims. The invention itself, however, both as to its organization and method of operation, as well as additional objects and advantages thereof, will best be understood from the following description when read in connection with the accompanying drawings in which:

Figure 1:
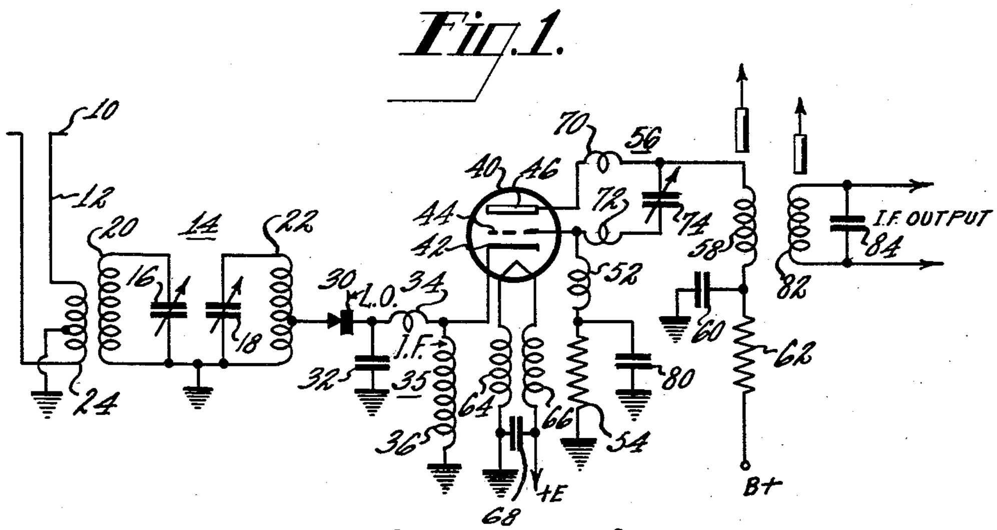
Figure 1 is a schematic circuit diagram of a high frequency converter unit embodying the invention.

Referring now to the drawings, wherein like reference numerals will be used to designate similar components throughout, and particularly to Figure 1, an antenna 10 such as a U. H. F. television antenna is connected through a suitable two-conductor transmission line 12 to the input terminals of an ultra high frequency converter. The radio frequency input circuit for the converter includes a double tuned resonant structure 14 having a pair of variable capacitors 16 and 18. The resonant circuit structure may be of any well-known type such as a resonant transmission line having variable capacity end loading. A pair of inductors 20 and 22 which represent the distributed inductance of such a transmission line are tuned by the variation of the capacitors 16 and 18 to the frequency of the signal to be received.

Signal energy from the antenna 10 is coupled to the radio frequency input circuit through the coupling inductor 24. The inductor 24 may comprise an inductive loop which has a grounded center tap. U. H. F. signal energy of the desired frequency is selected by and conveyed through the radio frequency input circuit 14 to a signal mixer device 30, for mixing with a local oscillator signal. The signal mixer device 30 which is shown as a crystal diode is connected between a tap on the inductor 22 and the cathode of a dual function oscillator-intermediate amplifier stage to be described hereinafter. The tapping point on the inductor 22 is selected so that the impedance of the radio frequency signal input circuit 14 substantially matches the impedance of the diode mixer 30. The converted radio frequency signal is then fed to the dual function stage through the coupling circuit 35.

The coupling circuit 35 includes inductors 34 and 36, and capacitors 32 and the inherent input capacitance of the dual function tube 40. The capacitor 32 completes the R. F. current path from the selection circuit 14 to ground, and the impedance thereof at signal frequencies is kept as low as possible so that the maximum amount of signal energy is developed across the mixer 30. The inductor 34, the capacitor 32, and the inherent input capacitance form a low-pass filter whose cut-off frequency is always higher than the intermediate frequency, but it is adjustable by properly selecting the relative values of the inductor and capacitors. The exact cut-off frequency, however, corresponds to the condition for optimum oscillator injection.

The said low-pass filter provides additional selectivity and at the same time introduces an appropriate amount of mismatch between the mixer 30 and the dual function tube 40 which will be described in detail later. The inductor 36 completes the D. C. paths both for the mixer 30 and for the dual function tube 40, thus eliminating a blocking capacitor which would otherwise be required. The inductor 36 has a relatively high impedance to either the oscillator frequency or the intermediate frequency.

The dual function stage includes a triode electron tube 40 which has a cathode 42, a control grid 44 and an anode 46.

In considering the circuit structure of the dual function stage 40 the oscillator portion will be discussed first. The control grid 44 is grounded through a grid leak resistor 54 and an inductor 52 which also has high impedance to oscillator frequencies. The anode 46 is supplied with a suitable operating voltage through a portion of a frequency determining circuit 56 for the oscillator, a primary winding 58 of an I. F. output transformer and a voltage dropping resistor 62. The transformer winding 58 which is of high impedance at the oscillator frequency prevents these signals from getting into the power supply. The low signal potential side of the winding 58 is suitably connected to ground for both I. F. and oscillator signals by the bypass capacitor 60. The filament for the tube 40 is supplied with filament heating current through the inductors 64 and 66. The inductor 64 is directly grounded and the inductor 66 is bypassed to ground through a capacitor 68.

The oscillation generator comprises as its frequency determining circuit the resonant circuit 56 which includes the inductors 70 and 72 and a capacitor 74 connected in series between the anode 46 and the control grid 44. The resonant frequency of the series resonant circuit 56 may be changed by varying the capacitor 74. In this manner the oscillation generator may be tuned through a predetermined portion of a U. H. F. band. As explained above, the series resonant circuit 56 may comprise a resonant line structure having its open end terminated by a variable capacitor.

The heterodyning signal wave developed by the oscillation generator is impressed on the signal mixer diode 30 through the coupling circuit 35. As previously mentioned, the coupling circuit 35 includes an inductor 34 and a capacitor 32 connected in series between the cathode 42 of the tube 40 and ground. The relative impedances of the capacitor 32 and the inductor 34 at the oscillator frequency are selected so that the oscillator voltage developed across the capacitor 32 is the optimum injection voltage for the mixer 30.

The intermediate frequency amplifier portion of the dual-function stage includes the cathode input circuit including the inductor 36. A capacitor 80, which is selected to series resonate with the grid inductor 52 at the intermediate frequency is connected between ground and the junction of the resistor 54 and the inductor 52. Hence the control grid 44 is effectively grounded for signals of the intermediate frequency. The I. F. transformer primary winding 58 which is connected in the anode circuit of the tube 40 resonates with the inherent and distributed capacitances of the circuit at the intermediate frequency and hence provides an output circuit for amplified signals of the intermediate frequency. It should be noted that the inductors 70 and 72 have only very small impedances at the I. F. and hence have virtually no effect in the operation of the I. F. amplifier. The winding 58 is inductively coupled to a secondary winding 82 which is tuned by a combination of the distributed capacitances between the turns of the secondary winding and a small fixed capacitor 84 is also tuned to the intermediate frequency and is connected to the output terminals of the converter unit.

In the operation of the converter unit of the invention, a received U. H. F. television signal is combined in the signal mixer 30 with a local oscillator signal developed in the dual function tube 40. The mixer 30 is coupled to the dual function stage 40 through the combination signal coupling and oscillator injection circuit 35. The resulting I. F. signal is fed to the dual function stage for amplification and is then coupled to the output terminals of the converter unit.

For amplification of the converted signal, the dual function stage is connected for the grounded grid operation. The grounded grid amplifier has an input impedance which is on the order of 150 ohms which is approximately ¼ of the output impedance of the crystal mixer 30 (on the order of 600 ohms). This mismatch is advantageous with regard to the noise factor of the converter since it has been found that the operation of a crystal mixer into about a 4 to 1 impedance mismatch produces the optimum noise factor for the circuit.

There is very little interaction between the oscillator and amplifier portions of the circuit because of the wide difference in the frequency of operation. In other words, the circuit components for oscillator operation have very little effect at the I. F., and likewise the amplifier components have little effect on the oscillator operation. The converter unit in accordance with the invention includes a dual function tube and the accompanying simplified circuitry which enables excellent converter performance at a minimum cost.

Figure 2:
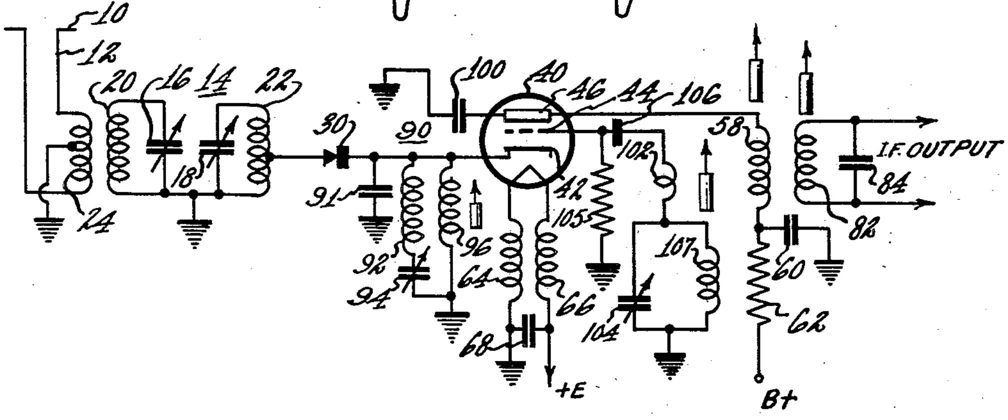
Figure 2 is a schematic circuit diagram of a modification of a high frequency converter unit in accordance with the invention.

Referring now to Figure 2, the input portion of the converter unit is the same as that described above in connection with Figure 1, in that a received U. H. F. signal is passed through the radio frequency input circuit 14 to the crystal mixer 30. The coupling circuit 90 between the crystal mixer 30 and the dual function tube differs from the one shown in Figure 1 and includes three shunt paths from the mixer diode 30 output electrode to ground. The first path comprises a capacitor 91 which determines the radio frequency impedance. The capacitor 91 in combination with the other elements of the coupling circuit 90 should provide substantially a short circuit to ground for radio frequency or the impedance thereof should be small as compared to the signal mixer 30, so that substantially all of the signal voltage is developed across the signal mixer. The second path is a series circuit including an inductor 92 and a capacitor 94, and the third path is a variable inductor 96. The capacitor 94 is adjusted to obtain optimum mixer excitation or oscillation injection and the inductor 96 is adjusted for optimum noise factor for this system. The last two adjustments are substantially independent of each other since the inductance of the inductor 96 is normally too high to effect the adjustment of the capacitor 94. The net effect of the coupling circuit 90 is to provide substantially no impedance to signal frequencies, and optimum impedance for the transmission of oscillator frequency signals to the signal mixer 30, and for the transmission of intermediate frequency signals from the mixer to the intermediate frequency amplifier.

Figure 3:
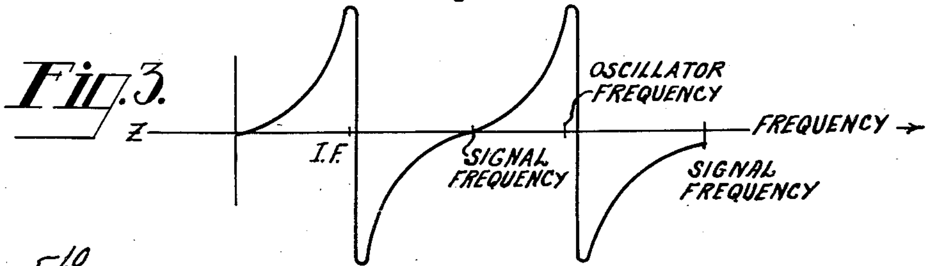
Figure 3 is a graph illustrating the relationship between the impedance and frequency of the signal coupling circuit between the signal mixer and the dual function stage of the converter unit shown in Figure 2.

The impedance vs. frequency curve of the coupling circuit 90 is shown in Figure 3. By reference to Figure 3, it can be seen that an impedance maximum for the coupling circuit 90 is presented for intermediate frequency signals, an impedance minimum is presented for signal frequency currents, and again an impedance maximum is presented for oscillation signals.

As was the case with the circuit described in Figure 1, the dual function stage 40 operates simultaneously as an I. F. amplifier and as a U. H. F. oscillator. The operation of the dual function stage is substantially the same as that described in connection with Figure 1 in that for I. F. signals the stage is connected to operate as a grounded grid stage. However, the oscillator of Figure 2 operates as a grounded plate oscillator as opposed to the balanced oscillator circuit shown and described in connection with Figure 1. With regard to the oscillator operation, the anode 46 is substantially at ground potential for signals of the oscillator frequency for the oscillator by a capacitor 100. The frequency determining circuit for the oscillator includes a series resonant circuit comprising an inductor 102 and a variable capacitor 104 connected in series between the control grid 44 and ground. The frequency determining circuit may comprise an unbalanced resonant transmission line such as concentric line with variable capacity end loading. That is, the frequency of resonance of the oscillator may be selected by proper adjustment of the capacitor 104. A D. C. blocking capacitor 106 is connected between the series resonant circuit and the control grid 44, and a grid resistor 105 completes the D. C. path from the grid 44 to ground.

A variable inductor 107 which is of high impedance at the oscillator frequency is connected in parallel with the capacitor 104 and is adjusted so that the parallel circuit is capacitive at the I. F. This parallel circuit should be sufficiently capacitive to resonate with the small inductor 102 at the I. F., thereby providing substantially a short circuit from the grid 44 to ground for I. F. signals.

The amplified I. F. signal is extracted in the output circuit including the I. F. transformer primary and secondary windings in the same manner as described above in connection with Figure 1.

The high frequency converter system which has been described includes a dual function stage which simultaneously operates as an I. F. amplifier and as a high frequency oscillator. This feature enables the construction of a converter unit having a greatly reduced number of component parts at a corresponding lower cost while retaining a high converter efficiency in operation. The reduced cost of the converter unit will tend to provide a larger market therefore and hence enable the maximum coverage for newly assigned U. H. F. television stations.

What is claimed is:

1. A high frequency conversion system comprising in combination, signal selection circuit means for applied signal modulated carrier waves of predetermined frequency, a signal mixer coupled to said signal selection circuit means, a dual function stage for said conversion system including common means for simultaneous operation as an intermediate frequency amplifier and as a high frequency oscillator, signal coupling means connected between said signal mixer and said dual function stage for conveying oscillator signals from said dual function stage to said signal mixer for combining with a selected signal modulated carrier wave to produce a corresponding intermediate frequency signal and for coupling intermediate frequency signals from said signal mixer to said dual function stage, and an intermediate frequency output circuit coupled to said dual function stage for deriving intermediate frequency signals therefrom.

2. A high frequency conversion system comprising in combination, signal input circuit means for connection with a source of high frequency signal energy; a signal mixer stage connected with said signal input circuit means; a dual function stage for said conversion system including an electron tube for simultaneous operation as an intermediate frequency amplifier and as a high frequency oscillator, a frequency determining circuit, means including said frequency determining circuit connecting said electron tube for operation as an oscillation generator, further means connecting said tube for operation as an intermediate frequency amplifier; and dual function circuit means between said signal mixer and said dual function stage which operates simultaneously as an oscillation injection circuit for conveying oscillator signals from said dual function stage to said signal mixer whereby the oscillator signals may be combined with signals applied to said input circuit means to produce a corresponding intermediate frequency signal, and as a signal coupling circuit for conveying intermediate frequency signals from said signal mixer stage to said dual function stage for amplification.

3. A high frequency conversion system comprising in combination, signal input circuit means for connection with a source of high frequency signal energy, a signal mixer stage connected with said signal input circuit means, a dual function stage for said conversion system including common means for simultaneous operation as an intermediate frequency amplifier and as a high frequency heterodyne oscillator, and dual function signal coupling means between said signal mixer and said dual function stage for conveying oscillator signals from said dual function stage to said signal mixer whereby the oscillator signals may be combined in said signal mixer stage with signals applied to said input circuit means to produce a corresponding intermediate frequency signal, and for conveying the resulting intermediate frequency signals from said signal mixer stage to said dual function stage for amplification and further utilization.

4. A high frequency conversion system comprising in combination, signal input circuit means for connection with a source of high frequency energy, a crystal mixer stage connected with said signal input circuit means, a dual function stage for said conversion system which is connected and includes common means for simultaneous operation as an intermediate frequency amplifier and as a high frequency heterodyne oscillator; a signal coupling circuit between said signal mixer and said dual function stage including a capacitor connected between said crystal mixer output electrode and ground, an inductor in series with a second capacitor connected between said mixer output electrode and ground, and a variable inductor connected between said mixer output electrode and ground, said first capacitor in combination with the other elements providing substantially zero impedance at the frequency of said input signal so that substantially all of the signal input energy is developed across the crystal mixer, said second capacitor adjusted to provide optimum oscillation injection from the dual function stage to the crystal mixer, and said variable inductor adjusted to provide optimum coupling of said intermediate frequency signal to said dual function stage.

5. A dual function stage for a high frequency conversion system, comprising in combination, an electron tube having at least an anode, a cathode, and a control electrode, means providing a resonant frequency determining circuit connected with said electron tube, feedback means for causing said electron tube to operate as an oscillation generator at the frequency of resonance of said frequency determining circuit, means coupled with said electron tube to receive oscillation signals therefrom for combination with a received input signal to produce a corresponding intermediate frequency signal, an intermediate frequency input circuit for said electron tube connected with said cathode, a series resonant circuit tuned to the intermediate frequency connected between said control grid and ground, said series resonant circuit providing relatively high impedance for signals of the oscillation signal frequency, and a signal output circuit connected with said tube for signals of the intermediate frequency.

References Cited in the file of this patent

UNITED STATES PATENTS

| | | |
|---|---|---|
| 2,428,300 | Stott | Sept. 30, 1947 |
| 2,432,183 | Slooten et al. | Dec. 9, 1947 |
| 2,631,229 | Chesus et al. | Mar. 10, 1953 |
| 2,750,496 | Horowitz et al. | June 12, 1956 |